(12) United States Patent  
Conterno (10) Patent No.: US 8,048,353 B2
(45) Date of Patent: Nov. 1, 2011

(54) MULTILAYER POLYMERIC PRODUCT BASED ON POLYETHYLENE TEREPHTHALATE AND POLYCARBONATE AND ITS USE AS A BUILDING MATERIAL

(75) Inventor: Cosimo Conterno, Beregazzo con Figliaro (IT)

(73) Assignee: Politec Polimeri Tecnici S.A., Stabio (CH)

( * ) Notice: Subject to any disclaimer, the term of this patent is extended or adjusted under 35 U.S.C. 154(b) by 0 days.

(21) Appl. No.: 12/661,202

(22) Filed: Mar. 12, 2010

(65) Prior Publication Data

US 2010/0264561 A1   Oct. 21, 2010

Related U.S. Application Data

(62) Division of application No. 11/371,769, filed on Mar. 9, 2006, now Pat. No. 7,704,592.

(51) Int. Cl.
*B29C 47/06* (2006.01)
(52) U.S. Cl. .................................. 264/173.12
(58) Field of Classification Search ............. 264/173.12
See application file for complete search history.

(56) References Cited

U.S. PATENT DOCUMENTS

| 4,861,630 | A | 8/1989 | Mihalich |
| 4,874,647 | A | 10/1989 | Yatsu et al. |
| 4,877,682 | A | 10/1989 | Sauers et al. |
| 5,780,158 | A | 7/1998 | Asai et al. |
| 5,783,307 | A | 7/1998 | Fagerburg et al. |
| 6,261,654 | B1 | 7/2001 | Maita et al. |
| 6,896,966 | B2 | 5/2005 | Crawford et al. |
| 7,014,896 | B1 | 3/2006 | Miyakawa et al. |
| 2002/0182352 | A1 | 12/2002 | Mitten et al. |

FOREIGN PATENT DOCUMENTS

| JP | 11-077938 | 3/1999 |
| JP | 2000-190439 | 7/2000 |
| JP | 2001-080012 | 3/2001 |
| JP | 2001-162749 | 6/2001 |
| JP | 2003-118059 | 4/2003 |

*Primary Examiner* — Yogendra Gupta
*Assistant Examiner* — Alison Hindenlang
(74) *Attorney, Agent, or Firm* — Hedman & Costigan, P.C.; James V. Costigan (57) ABSTRACT

A multilayer polymeric product is described, which consists of a co-extruded internal central layer of polyethylene terephthalate (PET) copolymer, in a quantity ranging from 80 to 90% by weight with respect to the total weight of the internal layer, mixed with polycarbonate (PC), in a quantity ranging from 10 to 20% by weight with respect to the total weight of the layer, and outer, side layers, of a blend of PET, in a quantity ranging from 15 to 25% by weight with respect to the total weight of the outer layers, and PC, in a quantity ranging from 75 to 85% by weight with respect to the total weight of said outer layers, in particular for use as a building material.

5 Claims, 10 Drawing Sheets
(1 of 10 Drawing Sheet(s) Filed in Color)

| Pos. | Description | Pos. | Description |
|---|---|---|---|
| A | High speed extruder coupled with special profile screws with high mixing power at high pressure | 1 | Forced feeding with temperatures from 80 to 140°C |
| B | Mixer with extruder feeder | 2 | Forced feeding with temperatures from 80 to 140°C |
| C | Co-extrusion extruder | 3 | Forced feeding with temperatures from 80 to 140°C |
| D | Co-extrusion extruder | 4 | Drying equipment – maximum temperature 180°C |
| E | UV protection extruder | | Dehumidification by extrapolation residual humidity lower 50 ppm |
| F | Homogenization equipment of various layers, relative compacting with "bleeding" of various polymers | 5 | Product regradation with increase in molecular weight |
| | | | Drying equipment – maximum temperature 180°C |
| G | Multilayer extrusion head | 6 | Dehumidification by extrapolation residual humidity lower 50 ppm |
| | | | Product regradation with increase in molecular weight |
| H | Calender with possible operating temperature regulation device from 10 to 140°C | 7 | Drying equipment – maximum temperature 180°C |
| | | | Dehumidification by extrapolation residual humidity lower 50 ppm |
| I | Continuous thermoforming with temp. from 10 to 140°C | | Product regradation with increase in molecular weight |
| L | Continuous thermoforming with temp. from 10 to 140°C | 8 | Drying equipment – maximum temperature 180°C |
| M | Standard extrusion accessory | | Dehumidification by extrapolation residual humidity lower 50 ppm |
| N | Standard extrusion accessory | | Product regradation with increase in molecular weight |
| O | Standard extrusion accessory | 9 | Drying equipment – maximum temperature 180°C |
| P | Standard extrusion accessory | | Dehumidification by extrapolation residual humidity lower 50 ppm |
| | | | Product regradation with increase in molecular weight |

Compact sheet:

Fig. 11

Compact corrugated sheet:

Sectional detail

Honeycomb sheet:

Fig. 14

MULTILAYER POLYMERIC PRODUCT BASED ON POLYETHYLENE TEREPHTHALATE AND POLYCARBONATE AND ITS USE AS A BUILDING MATERIAL

This application is a division of application Ser. No. 11/371,769, filed Mar. 9, 2006 now U.S. Pat. No. 7,704,592.

The present invention relates to a multilayer, polymeric product based on polyethylene terephthalate and polycarbonate, its relative use as a building material and the process for the production of the product itself.

As far as the product is concerned, the objective of the present invention is to find an alternative material to polyvinylchloride (PVC) or PMMA in the building industry and glass resin.

Polyethylene terephthalate (PET) is widely used in the production of all kinds of containers, in particular, bottles, extruded film products and sheets for applications in packaging and thermoforming. In its use as a building material, however, PET has various significant disadvantages substantially due to its poor thermal stability and low resistance to hydrolysis.

It has a low softening point and temperatures around 55° C. are in fact sufficient for softening PET (Vicat softening temperature: Method B50: 75° C. according to the regulation ISO 306). This limit obviously greatly interferes with the use of PET-based structures in the building industry as the high outside temperatures in the summer can reach values, such as those indicated above, in correspondence, for example, with connections with metallic profiles, such as aluminum.

The state of the art has therefore attempted to solve this problem by modifying the properties of PET (see patents such as EP152825, DE2917395, U.S. Pat. No. 4,226,961, EP270374, DE2647565, NL7903118), by the addition to PET, for example, of polyethylene naphthalate (PEN) or polycarbonates (PC), in the presence of special additives.

Polycarbonate is in fact characterized by a vicat softening temperature equal to 156° C. It is a material widely used in the building industry, is versatile, with an excellent dimensional stability, extremely resistant, with a good processability, relatively resistant to scratches, with excellent optical properties and UV stability.

Unfortunately, however, PC is an extremely expensive material and this prevents it from being more widely used in the building industry. Furthermore, it has a low resistance to solvents and to some chemical additives.

The multilayer polymeric product according to the present invention allows the drawbacks which characterized the known art to be overcome.

In particular, the objective of the present invention is consequently to provide a multilayer polymeric product which has a thermal resistance as close as possible to that of PC, which guarantees a greater resistance to chemical agents and which, at the same time, has a much lower cost than that of PC, and therefore compatible with use in the building industry, thus overcoming the limits which characterize the known art, obtaining, in our case, an increase in resistance to chemical agents with respect to PC.

An object of the present invention relates to a multilayer polymeric product which consists of a coextruded internal central layer, of polyethylene terephthalate (PET), in a quantity ranging from 80 to 90% by weight with respect to the total weight of the internal layer, mixed with polycarbonate (PC), in a quantity ranging from 10 to 20% by weight with respect to the total weight of the layer, and outer, side layers, of a blend of PET, in a quantity ranging from 15 to 25% by weight with respect to the total weight of the outer layers, and PC, in a quantity ranging from 75 to 85% by weight with respect to the total weight of said outer layers.

The outer layers are an upper layer and a lower layer with respect to the central layer.

The multilayer polymeric product, object of the present patent can have a honeycomb structure or a solid or corrugated structure, as indicated below.

In a particular embodiment, the multilayer polymeric product according to the present invention can be made up of 4 (four) layers, an internal central layer, two outer side layers and an overall outer layer for the whole system containing a specific UV protection.

FIGS. 10-13 show a compact sheet, compact corrugated sheet, a sectional detail and honeycomb sheet according to the invention where the layers point out the following:
  ① outer UV protection layer (20-60 microns)
  ② outer layer coextruded with a blend of PET and PC (50-150 microns)
  ③ central layer coextruded with a blend of PET and PC (500-700 microns)
  ④ outer layer coextruded with a blend of PET and PC (50-150 microns)

The internal central layer is preferably a blend of PET, in a quantity equal to 90% by weight with respect to the total weight of said layer, and PC, in a quantity equal to 10% by weight with respect to the total weight of said layer, and the two outer side layers are a blend of PET, in a quantity equal to 20% by weight with respect to the total weight of the two outer layers, and PC, in a quantity equal to 80% by weight with respect to the total weight of said layers.

In particular, the central layer has a thickness from five to seven times the thickness of the outer layer, preferably a thickness equal to six times the thickness of the outer layer.

A further object of the present invention relates to a process for the production of a multilayer polymeric product which consists in a coextruded internal central layer of polyethylene terephthalate (PET), in a quantity ranging from 80 to 90% by weight with respect to the total weight of the internal layer, mixed with polycarbonate (PC), in a quantity ranging from 10 to 20% by weight with respect to the total weight of the layer, and outer, side layers, of a blend of PET, in a quantity ranging from 15 to 25% by weight with respect to the total weight of the outer layers, and PC, in a quantity ranging from 75 to 85% by weight with respect to the total weight of said outer layers, said process comprising the following phases:
  i) the PET, possibly containing additives, is subjected to drying and regradation;
  ii) the PC, possibly containing additives, is subjected to drying;
  iii) the PC/PET blend, possibly containing additives, is subjected to drying;
  iv) PET and PC are subjected to blending at a temperature ranging from 80 to 140° C.;
  v) the blended product is charged into the main extruder and extrusion is effected of the internal layer at a pressure ranging from 70 to 450 atm and a temperature ranging from 250 to 350° C.;
  vi) the blend coming from phase iii) is extruded to give the two outer layers;
  vii) the three layers coming from phases v) and vi) converge in a coextruder where they are coextruded at an increasing pressure from 70 to 450 atm and a temperature varying from 230 to 270° C. and then stabilized;
  viii) the multilayer product coming from phase vii) is subjected to calendaring and thermoforming with by-step thermal cycles within a range of 10 to 140° C.

A further object of the present invention also relates to the use as a building material of a multilayer polymeric product which consists in a coextruded internal central layer of polyethylene terephthalate (PET), in a quantity ranging from 80 to 90% by weight with respect to the total weight of the internal layer, mixed with polycarbonate (PC), in a quantity ranging from 10 to 20% by weight with respect to the total weight of the layer, and outer, side layers, of a blend of PET, in a quantity ranging from 15 to 25% by weight with respect to the total weight of the outer layers, and PC, in a quantity ranging from 75 to 85% by weight with respect to the total weight of said outer layers.

The product has an overall quantity of PC equal to 10-20% of the total weight of the product.

A first important advantage of the product and process according to the present invention consists in the production of said product by means of an integrated production process, wherein all the production phases are carried out on line and in continuous. This process guarantees a reduction in the production costs and, contemporaneously, an increase in the intrinsic quality of the product.

Thanks to the production process according to the present invention, an increase in the technical characteristics and mechanical resistance of the product are obtained, even in the presence of a reduced percentage of PC (within 10-20% of the total weight of the product) with respect to the quantity of PC necessary for obtaining the same performances, adopting traditional production systems.

Furthermore, the production process according to the present invention allows PC and PET to be combined without the use of additives or compacting agents, but adopting a process in continuous, the application of different temperature sequences in the various production cycles (from 80 to 350° C.) and different section pressures ranging from 250 to 450 atm. The above process in particular envisages the application of the above "By-step" temperatures and pressures, i.e. not in continuous.

A fundamental advantage of the multilayer polymeric product according to the present invention is that it has a thermal stability comparable to that of PVC, PMMA, having the advantage however of guaranteeing a greater flame resistance; in the case of combustion, an inflow of non-harmful fumes and a greater mechanical resistance to high and low temperatures. The internal layer is in fact already stable to temperatures in the order of 70° C. and is further protected by the outer layers, richer PC, which are stable up to in temperatures in the order of 110-120° C.

A further advantage of the multilayer polymeric product according to the present invention consists in the high compatibility between the outer layers and the internal layer: this compatibility makes the structure extremely solid, making detachment between the central internal layer and outer side layers, practically impossible.

Another important advantage of the multilayer polymeric product according to the present invention is the following. Due to the particular process used in the production of the multilayer polymeric product, there is a bleeding effect of the PC: i.e. a gradual variation takes place in the concentration of the PC in the transition areas between the internal layer, which is less rich in PC, and the outer layers, richer in PC.

This gradual variation in the concentration of the PC also causes a gradual variation in the temperature resistance in the transition areas between the internal layer, which is less rich in PC, and the outer layers, richer in PC. This therefore creates a high elasticity of the multilayer polymeric product according to the present invention.

Figure 1:
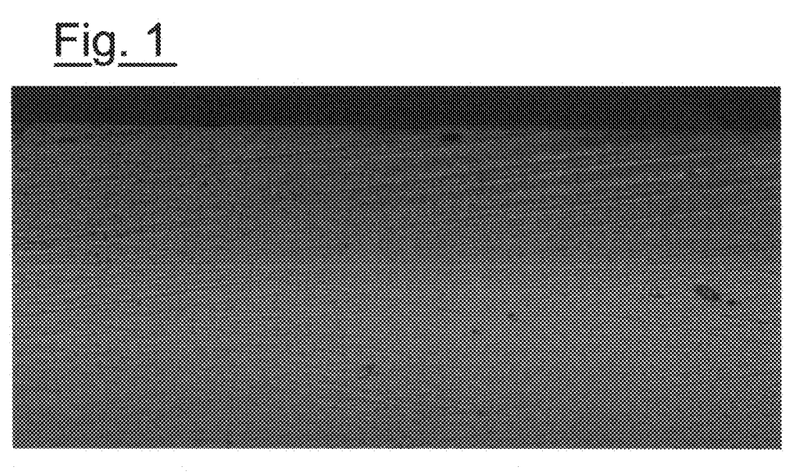
FIG. 1 shows the central internal layer and the upper outer layer (darker)
Figure 2:
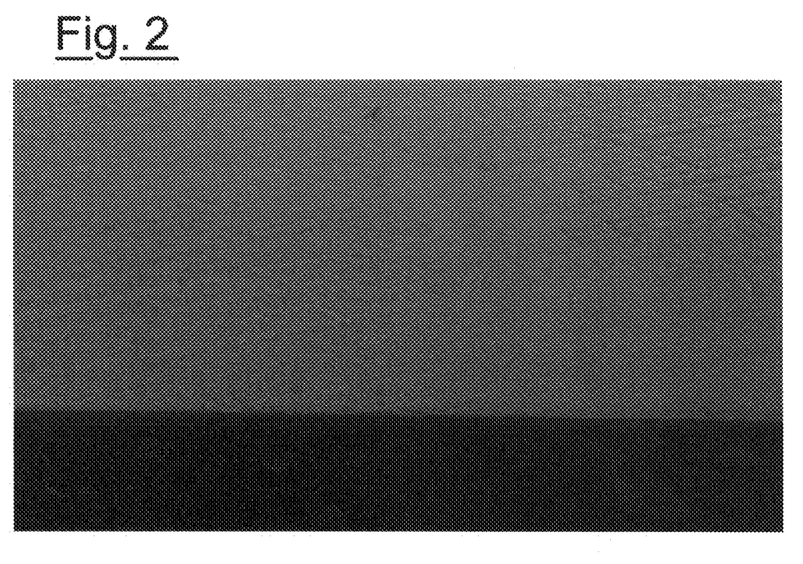
FIG. 2 shows the central internal layer and the lower outer layer (darker)

This effect is clearly visible in FIGS. 1 and 2 which are a photograph of the multilayer polymeric product according to the present invention. FIG. 1 shows the central internal layer and the upper outer layer (darker), FIG. 2 shows the central internal layer and the lower outer layer (darker).

In both figures, in fact, the darker area is the outer layer richer in PC, whereas the lighter area corresponds to the central internal layer, less rich in PC. An intermediate-coloured transition area can be clearly seen, where there is the bleeding effect of the PC between the light area and the dark area.

Furthermore, the multilayer polymeric product according to the present invention does not require preparation of the blends in mass, as described in all the documents of the known art (for example in patents EP152825, DE2917395, U.S. Pat. No. 4,226,961, EP270374, DE2647565, NL7903118), which would require the use of extremely complex equipment. In the process according to the present invention, in fact, it is not necessary to effect a pre-blending of the components as there is a continuous cascade processing flow.

The main advantage of the multilayer polymeric product according to the present invention consists in the fact that, with a total quantity of PC ranging from 10 to 20% by weight with respect to the total, it has a temperature stability equal to that of a blend containing 50-60% by weight of PC with respect to the total.

The multilayer polymeric product according to the present invention allows both honeycomb and solid and corrugated structures to be produced.

Furthermore the multilayer polymeric product has the following additional advantages.

The different softening temperature creates an induced self-tension system which compensates the tensions created by the external pressure loads. As the two tension systems annul each other, they allow the sheet to resist higher loads with respect to a sheet of an equal thickness produced with single-layered extrusion. This gives a higher resistance to external loads.

As the outer layers have better temperature resistance characteristics, they preserve the material they enclose, increasing its temperature resistance due to the shield effect. The outer material, in fact, has a low thermal conductivity coefficient, i.e. it limits the passage of heat by contact (induction) and, thanks to the presence of an additive which reflects infrared rays, a lesser heating of the surface of the sheet is obtained. This produces a higher operating temperature.

As the outer layers have better temperature resistance characteristics, they preserve the material they enclose, increasing its temperature resistance due to the containment effect. The softening of the weaker central material would normally cause the viscous deformation of the sheet but this is prevented by the outer presence of a material which. preserves its mechanical characteristics. This produces a higher operating material.

The surface temperature is kept lower thanks to the presence in extrusion of a layer of material with a high reflecting power which, by reflecting the solar radiation infrared component, allows two advantages to be obtained: 1) an increase in the operating temperature of the sheet an the performance increases with respect to direct exposure, 2) a decrease in the greenhouse effect inside the construction. This produces a higher operating temperature.

The protection offered by the outer material, having a greater resistance to hydrolysis, preserves the PET-based internal material from hydrolysis. This characteristic makes the product more long-lasting with respect to a single-layered product. This produces a longer duration.

The various refraction indexes of the different layers produce, as a result of the reflection of light rays, a better and greater light passage: better as there is the characteristic of uniformity and high diffusion, greater as the value is higher with respect to the light passage of the single-layered sheet. This produces a greater light passage.

In particular, the multilayer polymeric product according to the present invention, either with a honeycomb structure or with a solid and/or corrugated structure, can be used as a building material for greenhouses, extended building, skylights, canopies, horizontal sheathing, protection systems.

The honeycomb structure has a greater resistance and greater insulating properties.

In particular, the multilayer polymeric product according to the present invention preferably has a thickness varying from 4 to 16 mm in the case of honeycomb structures, a thickness varying from 0.5 to 5 mm in the case of solid structures and a thickness varying from 0.5 to 3 mm in the case of corrugated structures.

The internal layer of the multilayer polymeric product according to the present invention preferably has a thickness varying from 500 to 700 microns, the outer layer preferably has a thickness varying from 50 to 150 microns and the outer UV protection layer, when envisaged, preferably has a thickness. varying from 20 to 60 microns.

The polyethylene terephthalate preferably has an intrinsic viscosity ranging from 0.83 to 1.20 dl/g, preferably close to 1 dl/g.

The polycarbonate (PC) can be any PC, i.e. linear or branched PC with an MFI value (melt flow index)—according to the regulation ASTM D 1238—which varies from 4 to 12 g/10 min., preferably equal to 7 g/10 min; and an intrinsic viscosity varying from 1.2 to 1.4 dl/g, preferably 1.3 dl/g—according to the regulation ISO 1628-4.

Furthermore, the multilayer polymeric product according to the present invention can be coloured and can contain various additives such as protection additives against UV aging, infrared ray reflecting layers, various gradations of master-batches, depending on the particular characteristics of use of the end-product.

In particular, the multilayer polymeric product according to the present invention can variously contain mica powder and compatibilizing additives to obtain a heat reflecting effect and consequently lower the continuous operating temperature of the sheet.

The process for the production of the multilayer polymeric product according to the present invention allows the bleeding effect of the PC described above to be obtained specifically as a result of the particular thermal cycles envisaged in the four-layered co-extrusion.

In the coextrusion, the "by-step" pressures within a range of 70 to 450 atm, cause a bleeding phenomenon between one layer and another, eliminating problems of delamination and improving the mechanical characteristics of the product.

Furthermore, the "by-step" thermal processes carried out within a range of 10 to 140° C., to which the product is subjected (the two outer layers are shaped below the softening temperature, whereas the internal layer is folded at a temperature higher than the softening point) cause tensioning in the two outer layers with a consequent increase in the mechanical resistance of the sheet.

In particular, the process according to the present invention envisages that all passages be carried out on line and in continuous.

Furthermore, the process according to the present invention envisages, in the coextrusion, that the pressures vary "by-step" within a range of 70 to 450 atm, generating bleeding and that the thermal processes be carried out "by-step" within a range of 10 to 140° C., causing tensioning between the layers.

In particular, the process according to the present invention can also envisage the coextrusion of a fourth outer layer consisting of a PC/PET blend with a UV-ray protection additive.

The characteristics and advantages of the multilayer polymeric product and process according to the present invention can be better understood from the following detailed and illustrative description referring to the following figures and examples.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 5 is a legend of the contents of FIG. 4.

Figure 3:
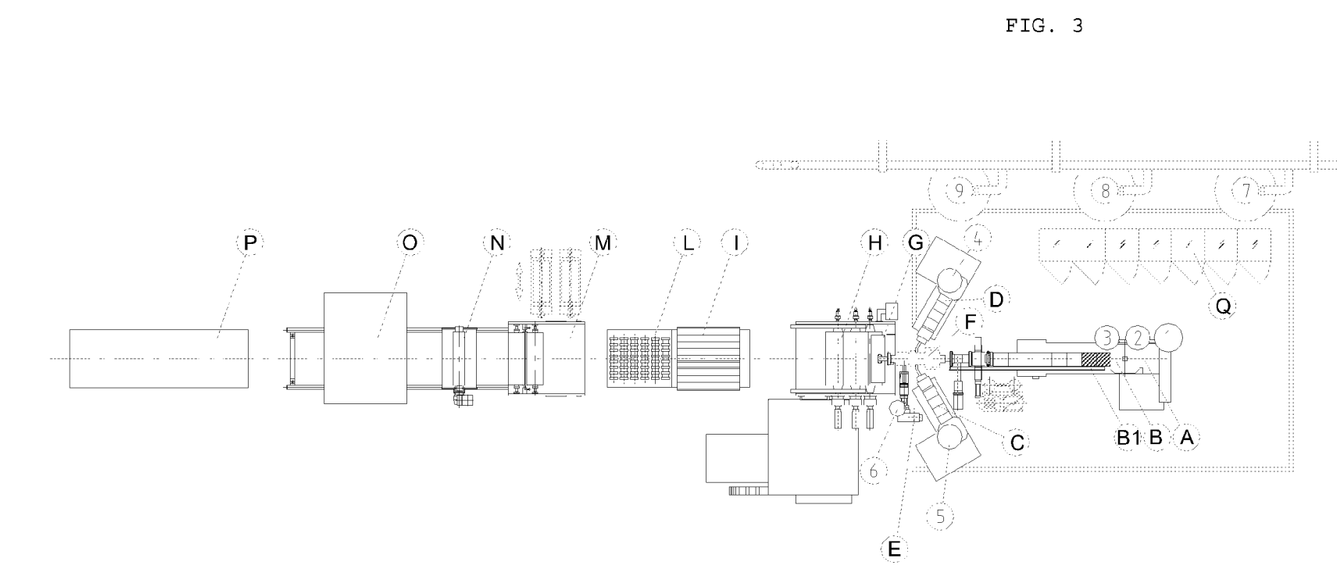
FIG. 3 shows a plan view of a line for effecting the process according to the present invention in one of its embodiments.
Figure 4:
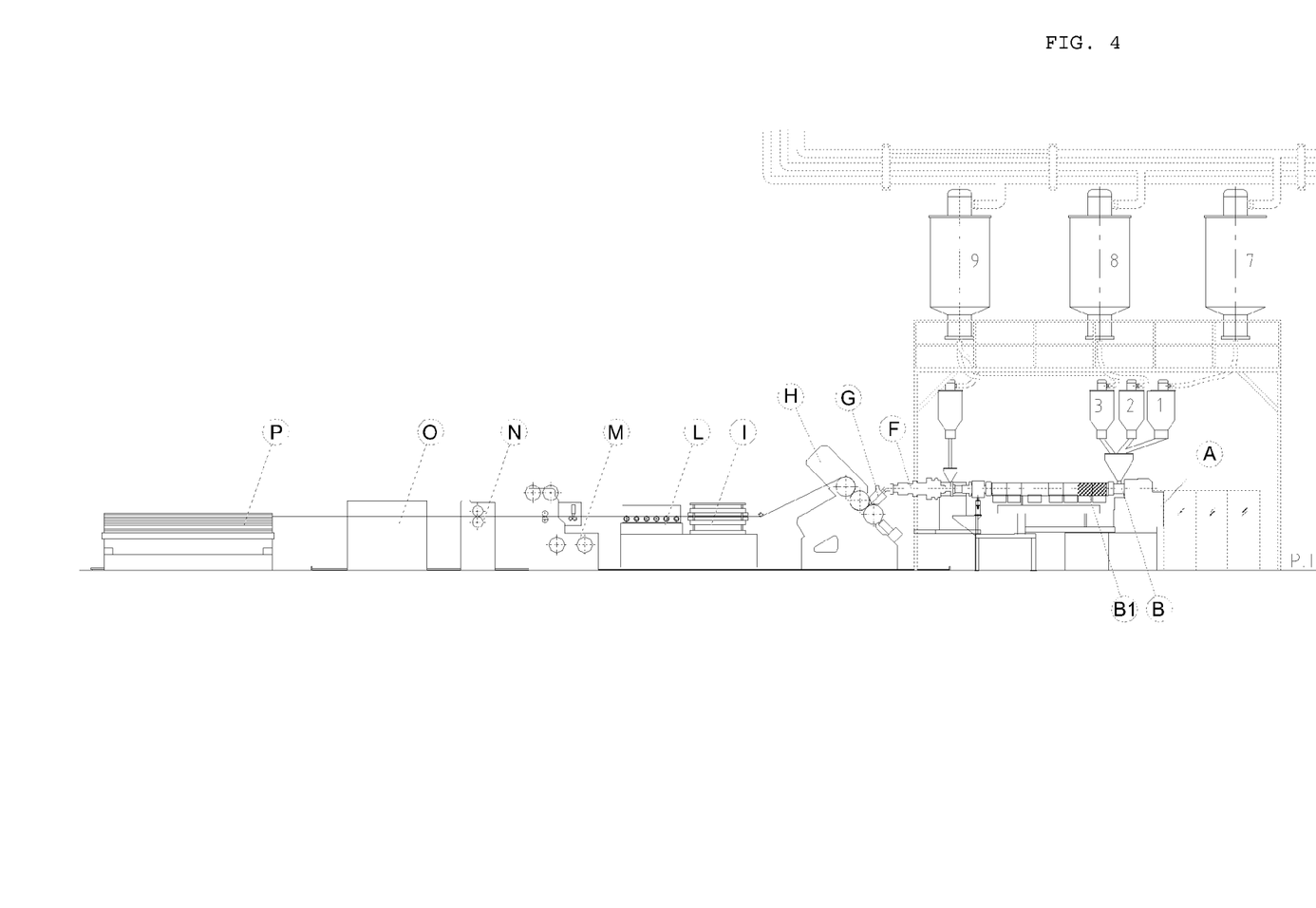
FIG. 4 shows a raised partially sectional side view of a line for effecting the process according to the present invention in one of its embodiments.

With reference to FIGS. 3 and 4, these indicate with a high-speed extruder coupled with screws with particular profiles, with a high mixing power at high pressure, with B a mixer with an extruder feeder; with C and D coextrusion extruders, with E a UV protection extruder, with F equipment for the homogenization of the various layers and relative compacting with a bleeding effect of the various polymers; with G a multilayer extrusion head, with H a calender with the possibility of regulating the operating temperature from 10 to 140° C.; with I and L thermoforming systems in continuous with temperatures ranging from 10 to 140° C., with M, N, O and P standard accessories of the extrusion lines such as multiple pull systems, polythening sheet application, sheet cutting and stacking.

1, 2 and 3 indicate blending stations of the raw materials, 4, 5, 6, 7, 8 and 9 systems for the drying, dehumidification and regradation of the raw material or product.

For greater clarity see the enclosed legend as FIG. 5.

In a particular embodiment, the process according to the present invention effected on line described above comprises the following phases. The polyethylene terephthalate(PET) (intrinsic viscosity index from 0.80 to 1.20 dl/g) with the presence of stabilizers and slip agents (such as phosphite/phenol and waxes), is subjected in the station 7 of FIG. 3 to a drying process until it reaches a residual humidity lower than 50 ppm. A regradation process is then initiated, which improves its intrinsic viscosity, ideally stabilized at 1.0 dl/g. The linear or branched polycarbonate (PC) (intrinsic viscosity index from 1.2 to 1.4 dl/g) with the presence of process additives (such as phosphite/phenol), is subjected in station 8 of FIG. 3 to a drying process. Drying of the PC/PET blend is then effected in station 9 of FIG. 3 at 180° with a UV-ray protection additive (benzotriazole).

In sections 1-2-3 of FIG. 3, the temperature passes from 80 to 140° C.: at this point the mixing between PET and PC is effected.

The product is charged into the extruder starting from section "B". In the first section of the high mixing screw ("B1") the maximum pressure of 450 atm and the maximum temperature of 350° C. are reached. In the remaining sections of the screw, before the station "F", the temperature is reduced to the normal operating temperature (250-300° C.) and the pressure drops to 70-150 atm.

The coextrusion of the product coming from the main extruder takes place in the station "F": the stations 4 and 5, relating to the outer layers, are fed by the apparatuses 7-8-9. The three flows converge in the centre of the coextruder "F" where they are coextruded and stabilized in the structure. The bleeding of the three layers is obtained thanks to the increasing pressures up to the maximum value.

In the extrusion head "G", the temperature falls to 230-270° C. and the product is extruded. Finally in the calender "H" and in the thermoforming stations "I" and "L", the product is subjected to "by-step" thermal cycles within a range of 10 to 140° C. through which the sheet is thermoformed and stabilized in its definite shape and characteristics. The stations M-N-O-P represent standard parts of the extrusion lines with pulling systems, polythening, cutting and stacking.

An applicative and non-limiting example of a product according to the present invention is provided hereunder, in particular an example of the production of a compact corrugated sheet.

EXAMPLE

Figure 14:
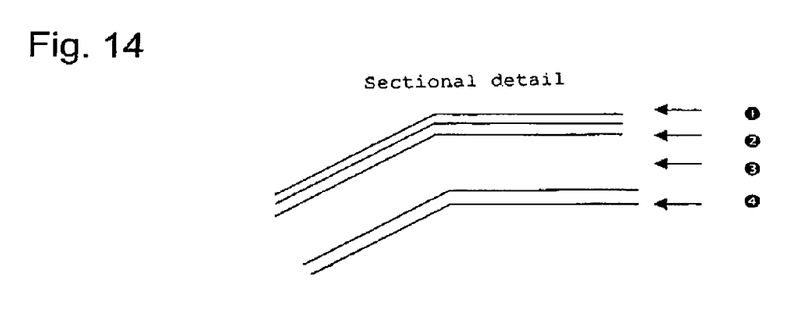
FIG. 14 shows a schematic view of thef sectional detail of the Example.

A solid corrugated sheet was produced with the method described above:
FIG. 14 shows the following elements:
① outer UV protection layer (40 microns)
② outer layer in coextrusion with a blend of PET and PC (0.1 mm)
③ central layer in coextrusion with a blend of PET and PC (0.6 mm)
④ outer layer in coextrusion with a blend of PET and PC (0.1 mm)

Some performances of the above multilayer polymeric product according to the present invention are specified below:

a) Operating temperature

Figure 6:
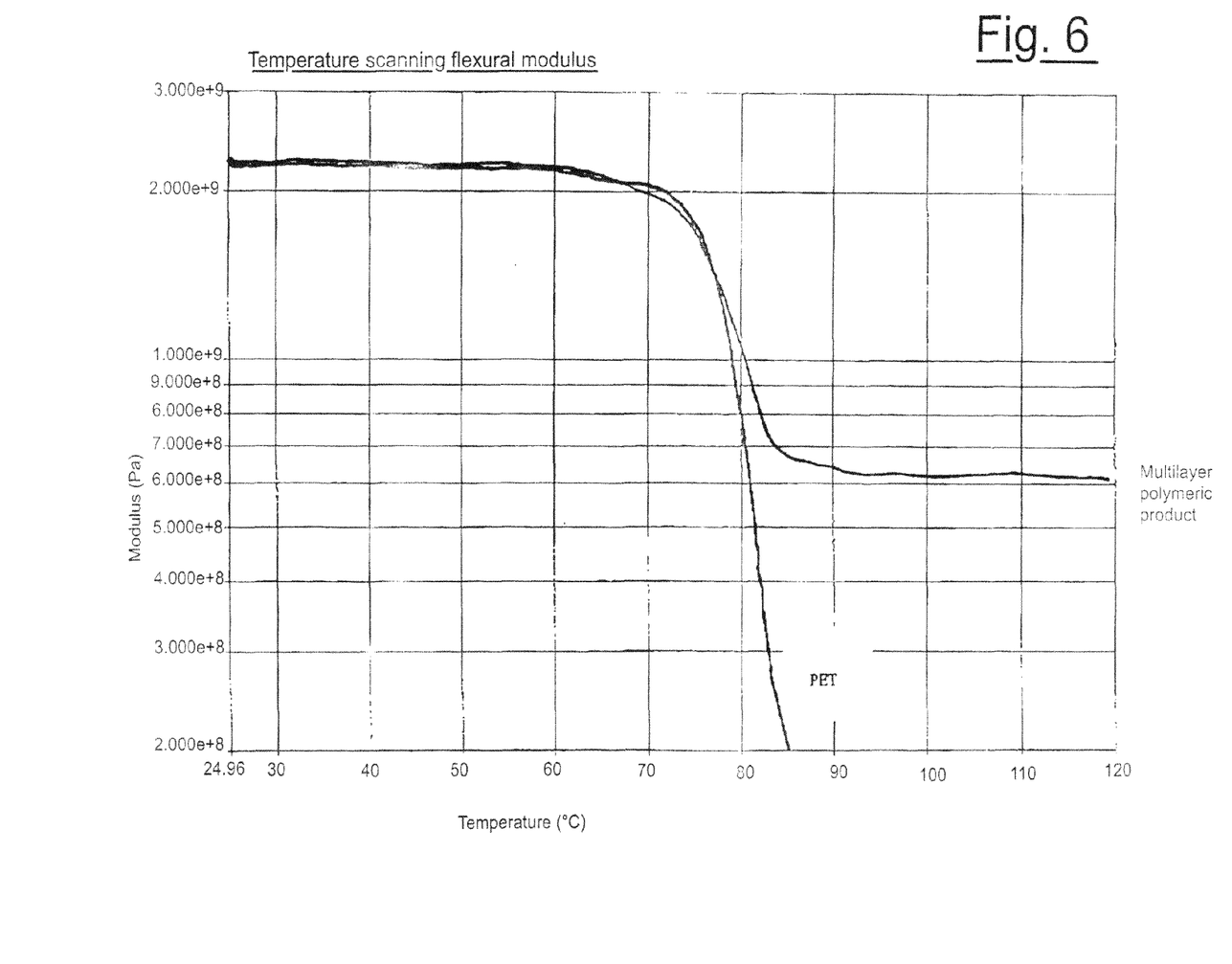
FIG. 6 is a graph concerning the elastic modulus of the multilayer polymeric product(MPP) that graphically represents the resistance of MPP at increasing temperature in comparison with a sheet of PET.
Figure 7:
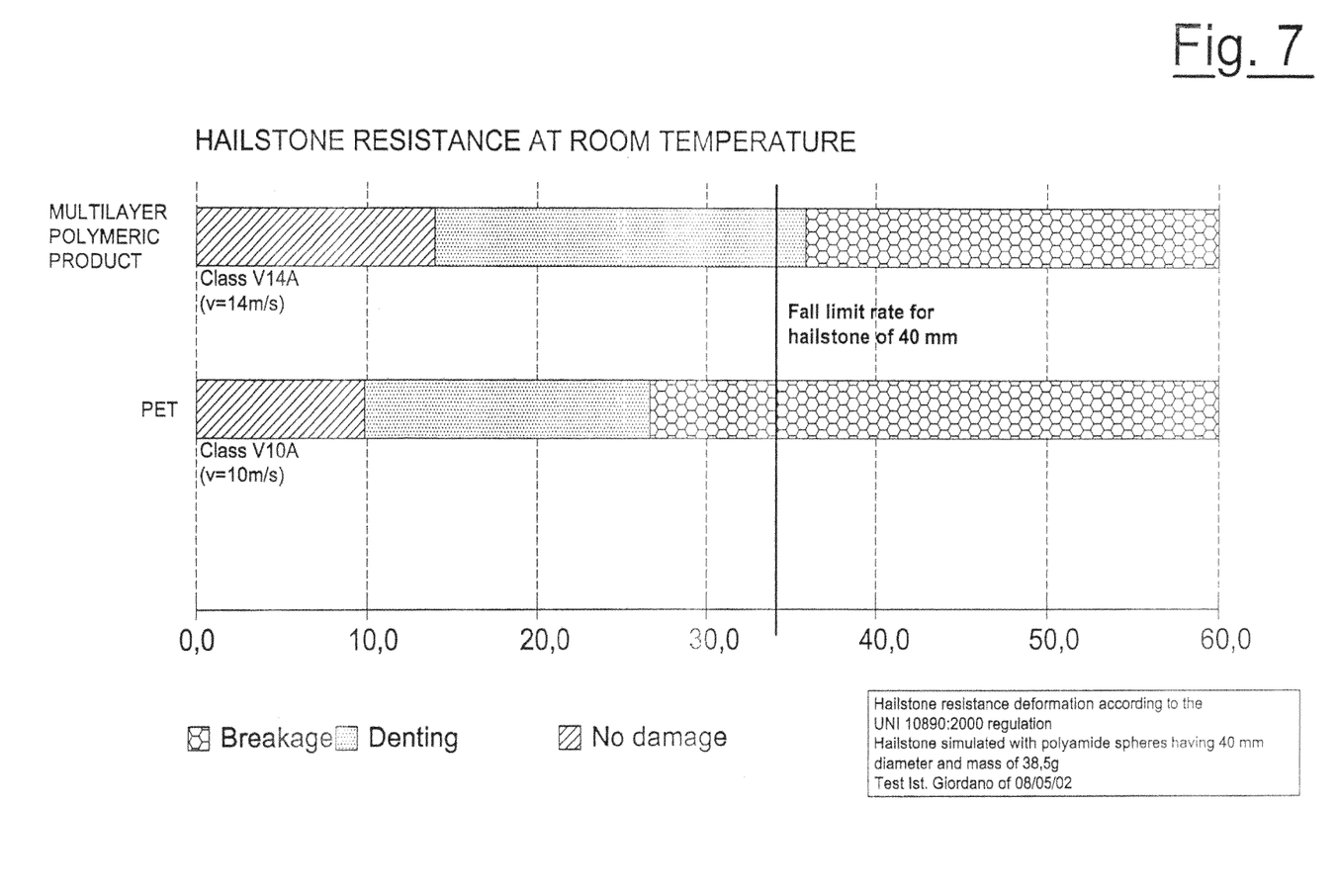
FIG. 7 is a graph showing the behavior to hailstone at roam temperature. MPP behavior is compared with the behavior of a PET sheet.
Figure 8:
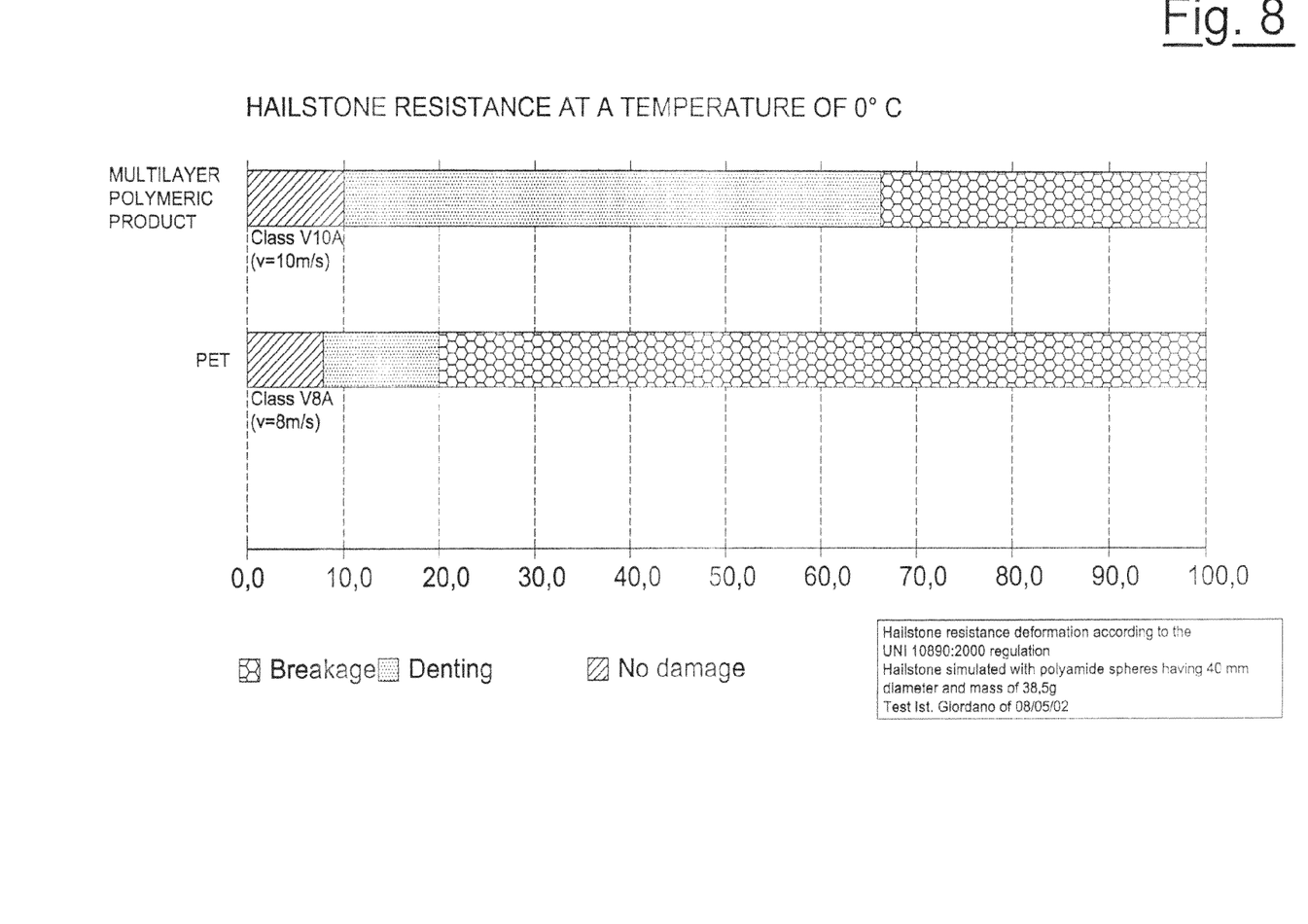
FIG. 8 is a graph which compares the behavior of MPP to PET when contacted with sphere of 40 mm.
Figure 9:
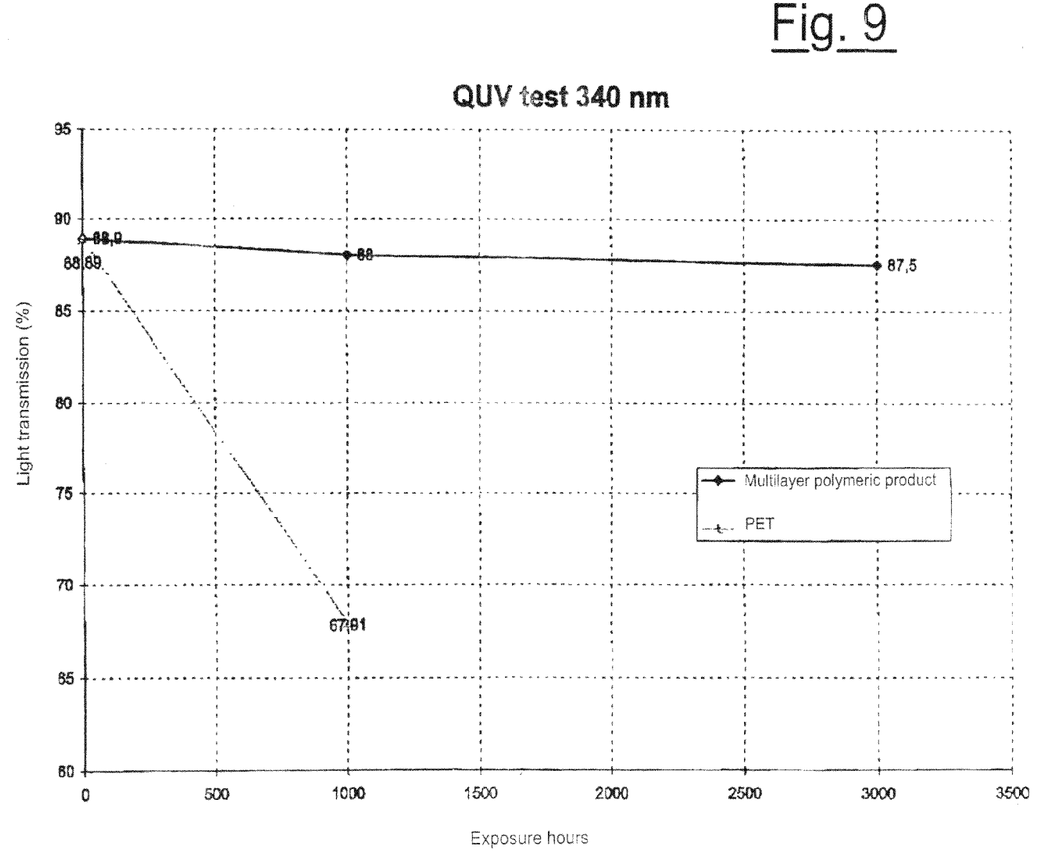
FIG. 9 shows the correlation between the value of Light Transmission in % and exposure to sun in hours where the performance of MPP and a PET sheet are compared.
Figure 10:
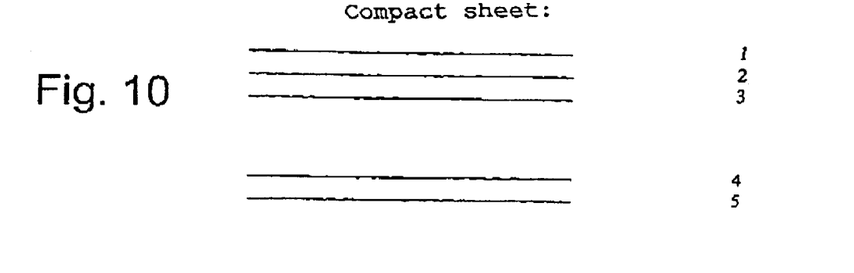
FIG. 10 shows a schematic view of a compact sheet according to the invention.
Figure 11:
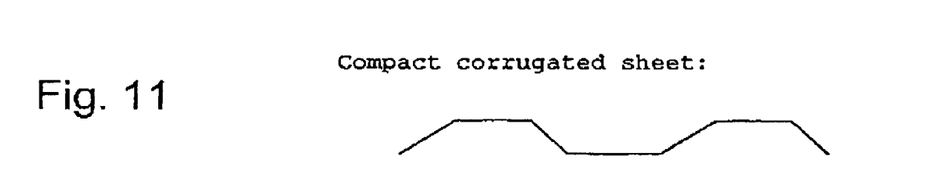
FIG. 11 shows a schematic view of a compact corrugated sheet according to the invention.
Figure 12:
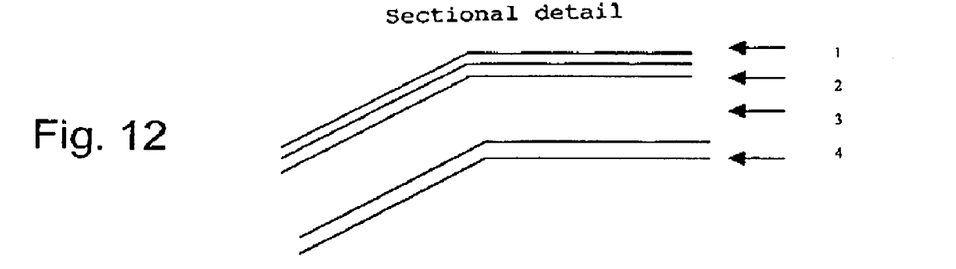
FIG. 12 shows a schematic sectional detail of a sheet according to the invention.
Figure 13:
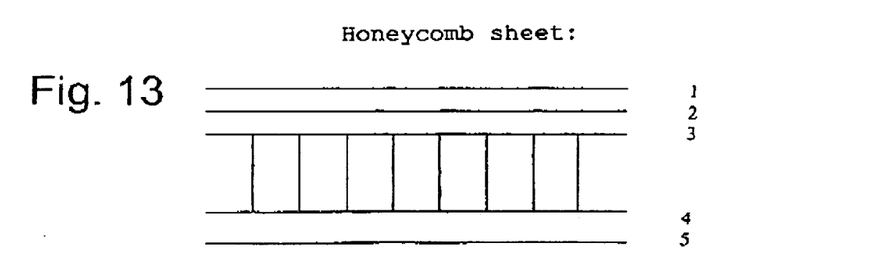
FIG. 13 shows a schematic view of a honeycomb sheet according to the invention.

The following values are obtained with a dynamo-mechanical analysis test, method DMA 7 (free point bending) carried out for a comparison with PET and with the multilayer polymeric product according to the present invention: for PET, once the intrinsic TG of PET has been exceeded (78° C.), the modulus falls and the values are no longer measurable; for the multilayer polymeric product according to the present invention, even after exceeding the intrinsic TG of PET (78° C.), the modulus remains at around a value of 600 MPA over 100° C. (see FIG. 6).

b) Mechanical resistance:

The following values are obtained with a hailstone resistance test at room temperature and at 0° C., carried out according to the regulation UNI 10890/2000 on sheets of PET and on the multilayer polymeric product according to the present invention:
  i) at room temperature (see. FIG. 7)
    for PET, breakage over 27 m/s=Group V10A;
    for the multilayer polymeric product according to the present invention: no breakage over 36 m/second=Group V14A.
  ii) at 0° C. (see FIG. 8)
    for PET, breakage over 20 m/s=Group V8A;
    for the multilayer polymeric product according to the present invention: no breakage over 66 m/second=Group V10A.

c) Resistance to hydrolysis:

The following values (see FIG. 9) are obtained with the QUV test 340 nm (cycle of 20 hours at 60° C.+4 hours condensation at 50° C.) to detect the light transmission after 1000 hours of aging, carried out for comparison, on sheets of PET and on the multilayer polymeric product according to the present invention:
  for PET: light transmission before aging: 88.89; to be compared with the value of 67.91 after exposure of 1000 hours, following hydrolysis.
  for the multilayer polymeric product: light transmission before aging: 88.9; to be compared with the value of 87.5 after exposure of 3000 hours.

The invention claimed is:

1. A process for the production of a multilayer polymeric product which comprises a coextruded internal central layer of a first blend of polyethylene terephthalate (PET) copolymer, in a quantity ranging from 80 to 90% by weight with respect to the total weight of the internal layer, mixed with polycarbonate (PC), in a quantity ranging from 10 to 20% by weight with respect to the total weight of the layer, and two outer, side layers, of a second blend of PET, in a quantity ranging from 15 to 25% by weight with respect to the total weight of the outer layers, and PC, in a quantity ranging from 75 to 85% by weight with respect to the total weight of said outer layers, said process comprising the following phases:
  i) subjecting PET, optionally containing additives, to crystallization drying and regradation;
  ii) subjecting PC, optionally containing additives, to drying;
  iii) blending the PET and PC at a temperature ranging from 80 to 140° C. to form the blends;
  iv) drying the first blend, optionally containing additives;
  v) charging the first blend into the main extruder and extruding said first blend to give the internal layer at a pressure ranging from 70 to 450 atm and a temperature ranging from 250 to 350° C.;

vi) drying the second blend, optionally containing additives;

vii) extruding the second blend to give the two outer layers;

viii) converging and stabilizing the three layers in a coextruder where they are coextruded at an increasing pressure from 70 to 450 atm and a temperature varying from 230 to 270° C. to give a multilayer product;

ix) calendering and thermoforming the multilayer product using by-step thermal cycles within a range from 10 to 140° C.

2. The process according to claim 1, characterized in that all the steps are effected on line and in continuous.

3. The process according to claim 1, characterized in that in the coextrusion, the pressure vary "by-step" within a range of 70 to 450 atm, at a temperature ranging from 230 to 270° C., causing bleeding.

4. The process according to claim 1, characterized in that the thermal processes are carried out "by-step" within a range of 10 to 140° C., causing tensioning between the layers.

5. The process according to claim 1, characterized in that it comprises the coextrusion of a further outer layer consisting of a third blend of PC/PET with a UV-ray protection additive.

* * * * *